Patented July 18, 1939

2,166,797

UNITED STATES PATENT OFFICE 2,166,797

PROCESS OF FORTIFYING CEREAL PRODUCTS WITH MINERALS

Ferdinand A. Collatz, St. Paul, Minn., assignor to General Mills, Inc., a corporation of Delaware No Drawing. Application August 17, 1938, Serial No. 225,444

2 Claims. (Cl. 99—83)

The present invention relates to a process of fortifying cereals and cereal products with minerals and more particularly to a process of increasing the calcium and phosphorus content of cereals and cereal products.

The principal object of my invention is to increase the calcium and phosphorus content of cereals and cereal products without thereby imparting any disagreeable flavor to the cereal or cereal product.

Another object of my invention is to provide a cereal product in which the ratio of calcium and phosphorus should be between 1 and 2, to favor maximum utilization of the mineral intake.

A further object of my invention is to provide a process of preparing a ready-to-eat breakfast cereal made from cooked dough in which suitable proportions of a mixture of phosphorus and calcium compounds are added to the dough to form a neutral mineral mixture in the dough.

Nature does not provide cereal grains with a high mineral content and most cereal products cannot be regarded as good sources of these elements. Cereal breakfast foods made solely or primarily from corn meal or grits are particularly deficient in calcium. Attempts have heretofore been made to enrich these cereal foods by the addition thereto of certain naturally occurring calcium phosphates, such as mono calcium phosphate, di calcium phosphate, tri calcium phosphate, and calcium pyro phosphate. However, when these compounds were added singly to the cereal and cooked therewith, a disagreeable metallic flavor was imparted to the cereal.

My invention is based upon the discovery that the above-mentioned difficulties may be obviated and that a cereal product containing a high calcium and phosphorus content may be produced without thereby imparting any disagreeable flavor to the cereal by a process which comprises forming a mixture consisting of acid and alkaline phosphates in suitable proportions to form a neutral mixture (in solution) and adding to the phosphate mixture a suitable quantity of finely precipitated calcium carbonate, and adding the composite mineral mixture to a dough or cereal mass from which the finished cereal is made whereby a neutral mineral mixture is formed in the dough or cereal mass.

In practicing my invention, I prefer to enrich a cereal product so that its calcium and phosphorus content approaches that of milk, which is recognized by nutrition experts as an ideal combination of phosphorus and calcium in the dietary. I take about 10 parts of sodium acid phosphate and add it to 18 parts of disodium phosphate, and then add the phosphate mixture to 30 parts of finely precipitated calcium carbonate, and thoroughly blend the three ingredients. This mineral mixture is so proportioned as to form a neutral mineral mixture having a hydrogen-ion concentration of approximately pH 7.0, in solution.

The mineral mixture, as formed above, is then added to a dough or cereal mass from which the finished cereal is made, in the amount of approximately .5%, by weight, and thoroughly mixed with the dough or cereal mass to form a neutral mixture or solution therein.

It will, of course, be understood that the amounts of the various phosphates and calcium salts can be varied depending upon the degree of fortification desired, and upon the nature of the cereal to be fortified. Also, it will be understood that potassium phosphates may be used instead of the sodium phosphates. However, I prefer to use the latter compounds because of their superior taste and economy.

In the above described composition, the monosodium phosphate and the di sodium phosphate are both water-soluble. However, the mono sodium phosphate has an acid reaction in water and di sodium phosphate has an alkaline reaction in water. When aqueous solutions of the two phosphates are added together, in the proper proportions, a neutral solution is obtained having a hydrogen-ion concentration of approximately pH 7.0.

In the above-described composition, calcium carbonate is very sparingly soluble in water (1.5 parts per million). Its addition will not materially change the neutrality of the phosphate mixture.

The combination of the above-mentioned phosphates and calcium salt are therefore neutral in cereal dough or in a cereal mass from which the finished cereal product is made and the mineral ingredients do not react with each other or with other ingredients of the cereal dough to form complexes having a bad flavor.

The following specific example will serve to illustrate and explain my invention. The following ingredients were mixed or blended together to obtain a calcium and phosphorus fortified cereal product. Approximately 86 parts of white corn cones, 2.5 parts of yellow corn cones, 3.0 parts of cane sugar, 2.0 parts of salt, 4.5 parts of tapioca flour, 3.0 parts of wheat germ, and .50 part of my mineral mixture comprising the following ingredients was added to the previously mentioned ingredients: 17.5%, by weight, of monosodium phosphate, 36.8%, by weight, of disodium phosphate, and 45.7%, by weight, of calcium carbonate. The mixture was fed by suitable means, such as by an automatic feeder, to a cooking chamber, and sufficient water was added thereto to form a dough of the desired consistency. The mineral mixture, mentioned above, forms a neutral solution in the dough. Upon analysis of the dough, it was found that the normal calcium content thereof had been increased ten to twenty fold while the phosphorus content was approximately doubled. This process of fortification establishes a mineral ratio favorable to efficient dietary utilization.

By utilizing my improved process, the calcium and phosphorus content of cereals and cereal products may be substantially increased without thereby imparting any disagreeable flavor or taste to the cereal or cereal product. It will be understood that the calcium carbonate, while normally insoluble, will neutralize the natural acidity of the material to which it is added and will also neutralize any acidity which forms during cooking.

While the invention has been described in detail with specific examples, such examples are illustrative and are not given as limitations, since other modifications within the spirit and scope of the invention will be apparent to those skilled in the art. Hence, the invention is to be understood as limited only as indicated, in the appended claims, in which the intent is to set forth all the novelty over the prior art.

I claim as my invention:

1. A process of fortifying cereals and cereal products with calcium and phosphorus which comprises mixing together a sufficient quantity of sodium acid phosphate and disodium phosphate to form a neutral mixture and then mixing the phosphates with finely precipitated calcium carbonate thereby forming a neutral mineral mixture having, in solution, a hydrogen-ion concentration of approximately pH 7.0, and then adding about .5%, by weight, of the mineral mixture to a cereal dough and mixing the mixture with the dough.

2. A process of fortifying cereals and cereal products with calcium and phosphorus which comprises mixing together sodium acid phosphate and di-sodium phosphate in such proportions as to form a neutral mixture and mixing the phosphates with calcium carbinate, adding the mineral mixture to farinaceous material, mixing the phosphates and calcium carbonate with the farinaceous material, adding sufficient water to form a dough and to dissolve the phosphates, and cooking the dough, the quantity of calcium carbonate added being at least sufficient to neutralize the natural acidity of the dough and any acidity which develops as the result of cooking.

FERDINAND A. COLLATZ.